United States Patent
Kozloski et al.

(10) Patent No.: US 10,168,859 B2
(45) Date of Patent: *Jan. 1, 2019

(54) CONTEXTUAL DETERMINATION OF EMOTION ICONS

(71) Applicant: International Business Machines Corporation, Armonk, NY (US)

(72) Inventors: James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,320

(22) Filed: Apr. 26, 2016

(65) Prior Publication Data

US 2017/0308267 A1    Oct. 26, 2017

(51) Int. Cl.
   *G06F 17/00* (2006.01)
   *G06F 3/0481* (2013.01)
   *G06F 17/24* (2006.01)
   *G06F 17/22* (2006.01)
   *G06F 17/27* (2006.01)
   *G06F 3/023* (2006.01)

(52) U.S. Cl.
   CPC .......... *G06F 3/04817* (2013.01); *G06F 3/023* (2013.01); *G06F 3/04812* (2013.01); *G06F 17/2217* (2013.01); *G06F 17/24* (2013.01); *G06F 17/248* (2013.01); *G06F 17/276* (2013.01); *G06F 17/2785* (2013.01)

(58) Field of Classification Search
   CPC .......... G06F 3/04817; G06F 2203/011; G06Q 50/01
   See application file for complete search history.

(56) References Cited

U.S. PATENT DOCUMENTS

| | | |
|---|---|---|
| 8,620,850 B2 | 12/2013 | Brown et al. |
| 8,682,306 B2 | 3/2014 | Hyon |
| 8,775,526 B2 | 7/2014 | Lorch et al. |
| 9,043,196 B1 | 5/2015 | Leydon et al. |

(Continued)

FOREIGN PATENT DOCUMENTS

| | | |
|---|---|---|
| CN | 102591471 A | 7/2012 |
| WO | 2007058420 A1 | 5/2007 |
| WO | 2008111699 A1 | 9/2008 |

OTHER PUBLICATIONS

Bowen et al.; "Face recognition and emotion evaluation to determine level of understanding and aid learning"; An IP.com Prior Art Database Technical Disclosure; IP.com No. IPCOM000224484D; Dec. 26, 2012; 3 pages.

(Continued)

*Primary Examiner* — Andrew T McIntosh
(74) *Attorney, Agent, or Firm* — Alexa L. Ashworth; A. Imtiaz Billah; Andrew Rodionov

(57) ABSTRACT

A method, computer program product, and system for contextual determination of emotion icons. The method includes, for a particular user, determining an emotion icon to automatically input into a message, based on a class of the user, a current mood of the user, and the recipient of the message. The determined emotion icon is then inserted into the message.

20 Claims, 5 Drawing Sheets

(56) References Cited

U.S. PATENT DOCUMENTS

| | | | |
|---|---|---|---|
| 2002/0194006 | A1 | 12/2002 | Challapali |
| 2006/0242593 | A1 | 10/2006 | Gaebel |
| 2009/0019117 | A1* | 1/2009 | Bonforte .............. G06Q 10/107 709/206 |
| 2009/0110246 | A1* | 4/2009 | Olsson .............. H04M 1/72544 382/118 |
| 2010/0082751 | A1* | 4/2010 | Meijer .................... G06F 15/16 709/206 |
| 2012/0047447 | A1* | 2/2012 | Haq .................... G06F 3/04847 715/752 |
| 2012/0059787 | A1* | 3/2012 | Brown .................. G06F 17/241 706/52 |
| 2012/0304074 | A1* | 11/2012 | Ooi ..................... G06F 3/04895 715/752 |
| 2013/0247078 | A1* | 9/2013 | Nikankin ......... H04N 21/44204 725/13 |
| 2014/0379352 | A1 | 12/2014 | Gondi et al. |
| 2015/0100537 | A1 | 4/2015 | Grieves et al. |
| 2015/0149925 | A1* | 5/2015 | Weksler ................ H04L 51/046 715/752 |

OTHER PUBLICATIONS

Fenwick Elliott; "We'll wink to that! Single people who use emojis have more sex, finds study—but men prefer heart eyes' and women favor 'smileys'"; Daily Mail; Feb. 4, 2015; 61 pages; <http://www.dailymail.co.uk/femail/article-2940278/We-ll-wink-Single-people-use-emojis-sex-finds-study-men-prefer-heart-eyes-women-favor-smileys.html>.

Han et al.; "Brain Activity of Adolescents with High Functioning Autism in Response to Emotional Words and Facial Emoticons"; PLOS ONE; Mar. 12, 2014; 10 pages; <http://journals.plos.org/plosone/article?id=10.1371/journal.pone.0091214>.

MacMillen; "Why "Abused Emojis" Are Heartbreaking—& So Necessary"; REFINERY29; May 27, 2015; 4 pages; <http://www.refinery29.com/2015/05/88139/abused-emojis>.

Maloney; "This Artist Uses Emoji to Explore Empathy, Autism, and How We Connect"; Dec. 26, 2013; 9 pages; <http://www.wired.com/2013/12/emoji-autism-spectrum/>.

Mell et al.; "The NIST Definition of Cloud Computing"; NIST Special Publication 800-145; Sep. 2011; 7 pages.

Yamamoto et al.; "Multidimensional sentiment calculation method for Twitter based on emoticons"; International Journal of Pervasive Computing and Communications; 2015; vol. 11; Issue 2; pp. 212-232.

"How to explain emoticons to an autistic person?"; Cognitive Sciences Stack Exchange; Asked Oct. 3, 2012; Printed Feb. 22, 2016; 4 pages; <http://cogsci.stackexchange.com/questions/1709/how-to-explain-emoticons-to-an-autistic-person>.

"How to Use Fewer Emoticons"; wikiHow; Printed Feb. 22, 2016; 4 pages; <http://www.wikihow.com/Use-Fewer-Emoticons>.

"System and method for interpreting and communicating emotions during electronic communication"; An IP.com Prior Art Database Technical Disclosure; IP.com No. IPCOM000234726D; Jan. 31, 2014; pp. 1-2.

"Why It's So Hard to Detect Emotion In Emails And Texts"; Fast Co. Design; Fast Company & Inc © 2016 Mansueto Ventures, LLC; Oct. 9, 2014; 7 pages; <http://www.fastcodesign.com/3036748/evidence/why-its-so-hard-to-detect-emotion-in-emails-and-texts>.

Kozloski et al. "Contextual Determination of Emotion Icons", U.S. Appl. No. 15/666,618, filed Aug. 2, 2017, 23 pages.

Appendix P—List of IBM Patents or Patent Applications Treated as Related, Filed herewith, 2 Pages.

* cited by examiner

CONTEXTUAL DETERMINATION OF EMOTION ICONS

BACKGROUND OF THE INVENTION

The present invention relates generally to the field of media content, and more particularly to automatically converting and displaying an emotion icon based on a learned estimation of the meaning of the emotion icon, and creating new emotion icons based on the learned estimation and conversion of the emotion icon.

The use of emoticons, emotisounds, and emojis is ubiquitous in society, and is an important means and adjunct to convey emotional and related nuances in conversations and communications, for example, e-mails, instant messages, and chats. Often, text alone can be insufficient for conveying tone, motivation, and mood, and is prone to misinterpretation by a receiving individual. Further, an emoticon or icon on their own can also be misinterpreted by a receiving individual.

An emoticon often expresses a user's feelings or mood and some devices have provided stylized pictures that do not use punctuation. As social media has become more widespread, emoticons often play a significant role in communication through technology. Emoticons offer a different range of 'tone' and feeling through texting, which portrays specific emotions through facial gestures, during a text-based communication.

SUMMARY

According to an embodiment of the present invention, a method for contextual determination of emotion icons is provided. The method comprises: determining, by one or more processors, for a user, at least one emotion icon to automatically input into a message, based on a class of the user and a recipient of the message, wherein the at least one emotion icon is determined, in part, based on a detected current mood of the user and the recipient; and inserting, by one or more processors, the determined at least one emotion icon into the message.

Another embodiment of the present invention provides a computer program product for the contextual determination of emotion icons, based on the method described above.

Another embodiment of the present invention provides a computer system for the contextual determination of emotion icons, based on the method described above.

DETAILED DESCRIPTION

An emoticon is a metacommunicative pictorial representation of a facial expression that, in the absence of body language and prosody, serves to draw a recipient's attention to the tenor or temper of a sender's nominal non-verbal communication, changing and improving its interpretation. An emotisound is a brief sound transmitted and played back during the viewing of a message. Emoji are ideograms and smileys used in electronic messages and Web pages. The characters exist in various genres, such as facial expressions, common objects, places, animals, and types of weather. For purposes of the present disclosure, 'emotion icon' includes an emoticon, emotisound, emoji, and any similar communication icons.

Embodiments of the present invention provide systems and methods for communicating emotion icons along with a means for learning the meaning of the emotion icons via context for one or more users, or cohorts of users. Embodiments of the present invention further provide systems and methods for automatically converting and displaying emotion icons based on the learning, and automatically creating new emotion icons based on the learning. Embodiments of the present invention provide systems and methods for providing feedback as to the efficacy and/or accuracy of the created emotion icons. Further, embodiments of the present invention provide systems and methods for removing emotion icons from a communication and embedding suppressed emotion icons in a communication.

Figure 1:
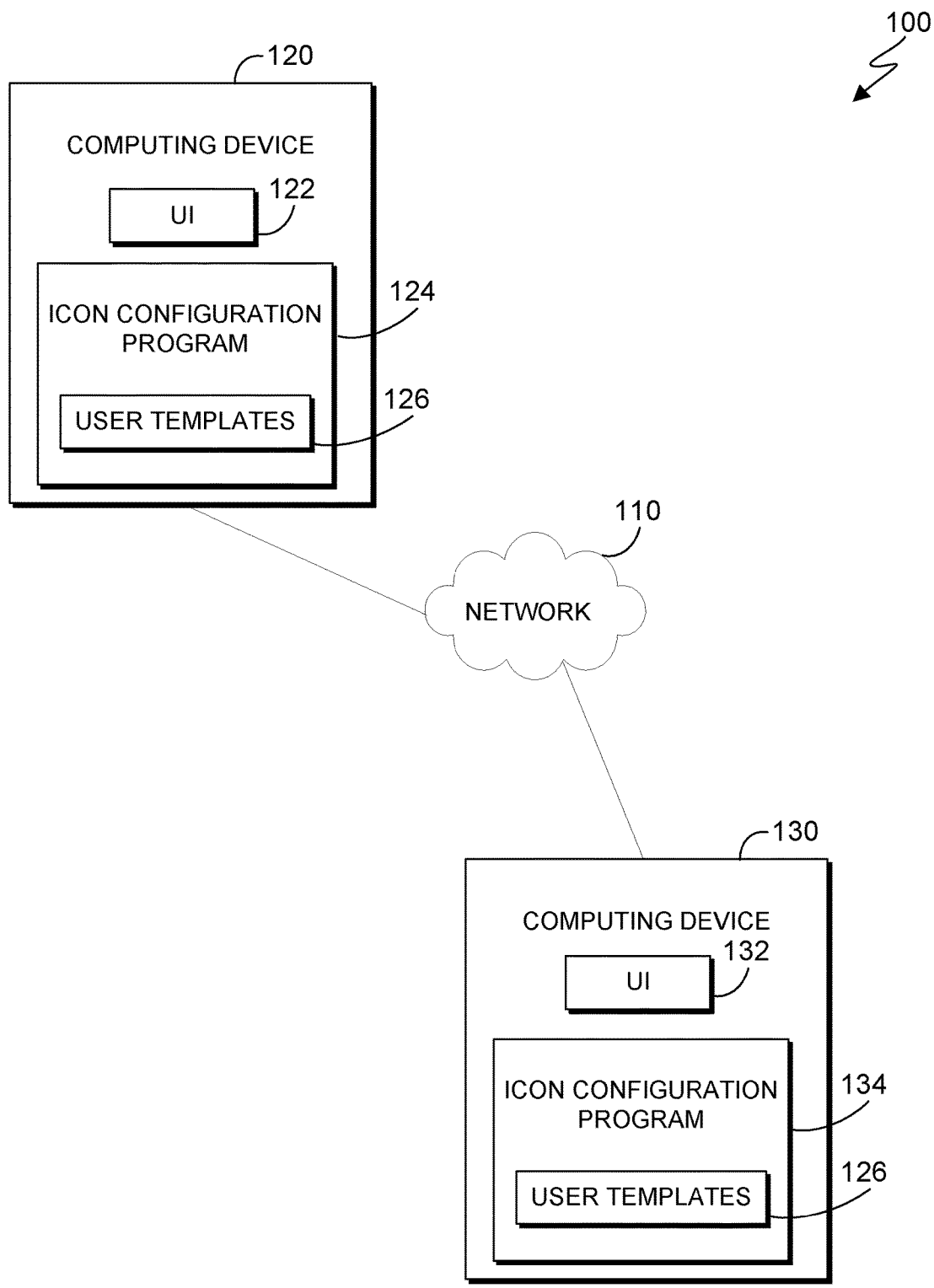
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. Modifications to distributed data processing environment 100 may be made by those skilled in the art without departing from the scope of the invention as recited by the claims. In an exemplary embodiment, distributed data processing environment 100 includes computing device 120 and computing device 130, interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication and/or access between computing device 120 and computing device 130.

Computing devices 120 and 130 include user interface (UI) 122 and 132 and icon configuration program 124 and 134, respectively. In various embodiments of the present invention, computing devices 120 and 130 can be a laptop computer, a tablet computer, a netbook computer, a personal computer (PC), a desktop computer, a personal digital assistant (PDA), a smart phone, a thin client, or any programmable electronic device capable of executing computer readable program instructions. Computing devices 120 and 130 may include internal and external hardware components, as depicted and described in further detail with respect to FIG. 4.

UI 122 and 132 may be, for example, a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. UI 122 and 132 are capable of receiving data, user commands, and data input modifications from a user. UI 122 and 132 is also capable of communicating with icon configuration program 124 and 134, respectively.

Icon configuration program 124 and 134 include user templates 126 and 136, respectively. Icon configuration program 124 and 134 are different instances of the same program, and reference will be made to icon configuration program 124, it being understood that it can apply to icon configuration program 134 or any other instances of icon configuration program in the data processing environment of FIG. 1. Icon configuration program 124 can be an application, plug-in, service, or a built-in functionality for implementation on computing devices 120 and 130. Icon configuration program 124 can learn and estimate the meaning of an emotion icon via a context for one or more users or classes of users. Icon configuration program 124 can automatically convert and display emotion icons, based on the learning. Icon configuration program 124 can automatically create new emotion icons, based on the learning and converting. Icon configuration program 124 can request and receive feedback as to the efficacy of created emotion icons, analyze the feedback, and apply the feedback to future uses. Icon configuration program 124 can remove unnecessary or inappropriate emotion icons from a conversation and can embed suppressed emotion icons into a communication, to provide more contextual information for a recipient.

In this exemplary embodiment, user templates 126 and 136 are a group of files, which contain different templates based on the determined class of the user. A class of the user is determined based on information received about the user, such as a user's current state (e.g., different cultures based on regions of the world, different demographics and ages, autistic, child, Asperger's, pre-Alzheimer's) and cognitive style. User templates 126 and 136 may control how the positioning, shape, and other features of a single emotion icon or a class of emotion icons are displayed to a user, in a manner which is most cognizable to the user, based on the user's determined current state and cognitive style.

Figure 2:
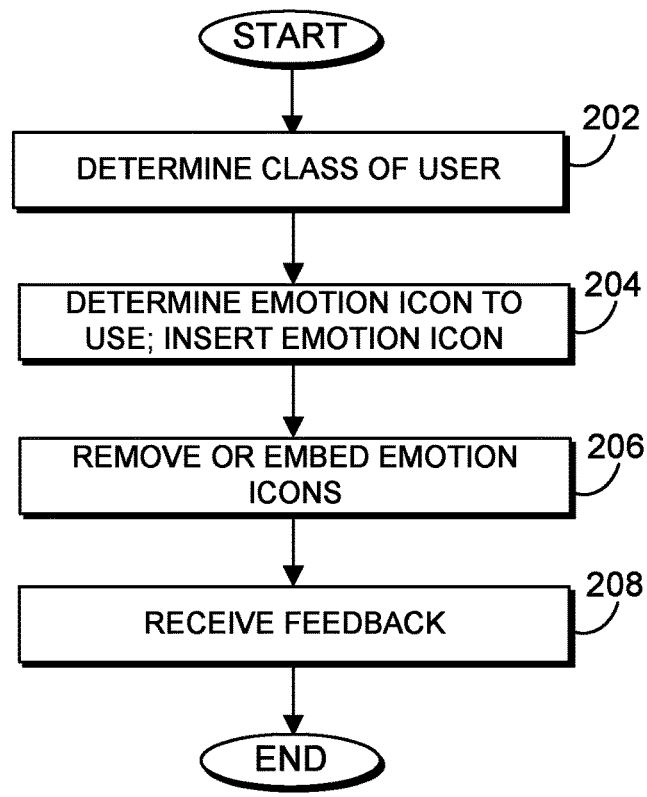
FIG. 2 is a flowchart illustrating operational steps for automatically generating an emotion icon based on cognitive considerations and user cohorts, in accordance with an embodiment of the present invention.

FIG. 2 is a flowchart illustrating operational steps for automatically generating an emotion icon based on cognitive considerations and user cohorts, in accordance with an embodiment of the present invention. The following flowchart is described with respect to icon configuration program 124 operating on computing device 120, it being understood that icon configuration program 134 on computing device 130, or any other computing device of FIG. 1 may perform the operational steps of FIG. 2.

In step 202, icon configuration program 124 determines the class of a user. In this exemplary embodiment, based on the class of the user, the user may want to use one of various user templates 126, which is most understandable to the user. The various templates based on the class of a user can be determined from the user's cognitive styles and current state or cohort (e.g., child, autistic, pre-Alzheimer's, demographic/ages, and cultures based on regions of the world), as emotion icons may not convey the appropriate nuances of emotions for different classes of users. Various user templates can control the GUI, spacing, arrangement, sizing, positioning, and user of color, as well as other features, to arrange emotion icons. For example, Anne may use a standard template, whereas Ben, who has autism, may find a template with an altered spacing, different colors, and different arrangements of emotion icons more useful.

Icon configuration program 124 can learn which user templates 126 are best for different classes of users over time. The learning may be based on text analysis associated with the use of icons, the nature of the individuals communicating, and other analysis methods which allow the program to learn. In one embodiment, a user may tap or touch a certain style of template, when the user 'likes' it (i.e., the user prefers using that particular template). In another embodiment, icon configuration program 124 may learn and estimate the meaning of emotion icons in a conversation using the intensity or speed of typing, choice of words, and/or repetition of words used by a user in a conversation. Icon configuration program 124 can consider emotion icons in context, including a consideration of actions, locations, and personalities, as well as 'inside jokes' and 'inside context' among groups of users. Icon configuration program 124 can learn nuances of these emotions, or can receive manual input from the users as to the contexts of the emotions. In another example, icon configuration program 124 may determine that a user is becoming impatient or nervous (or other emotions) during a conversation, based on the context and known personality traits associated with the user.

In yet another embodiment, icon configuration program 124 can monitor conversations in the user's social network, and may discover patterns of emotion icons or types of emotion icons shared by the user, and may determine a 'tone' of the different conversations. For example, young mothers may have a neighborhood group on their chat where they exchange advice and keep in touch with each other. Icon configuration program 124 may learn over time different types of themes and tones of the conversation, as well as different personas and their usage of emotion icons. For example, Ashley may be overly expressive, while Stephanie may be showing off in her conversations. Furthermore, various emotion icons may become frequently used within the group, and this is recognized by icon configuration program 124.

In step 204, icon configuration program 124 determines the appropriate emotion icon(s) to use in the conversation, and inserts the emotion icon(s) into the conversation. In this exemplary embodiment, as icon configuration program 124 learns patterns of communication and personal style, the program may automatically create and insert an emotion icon into a conversation. In one embodiment, this can be done using gaze tracking and real-time emotion detection capabilities. For example, an embedded camera may track, in real-time, a user's eyes during a conversation about which finger foods to serve babies, and may notice that the user's gaze drifts over to an online article, away from the conversation. Icon configuration program 124 may recognize this shift in user gaze, and automatically insert a 'smiley' icon. In another example, icon configuration program 124 may detect the user's real-time mood of disapproval in serving blueberries to a 9-month old, and automatically creates and inserts a 'surprised' smiley as a response to the conversation. In other embodiments, the real-time mood of the sender and/or recipient of an icon can be estimated using camera/gaze tracking, monitoring of typing characteristics (e.g., speed and intensity of typing), and other mood-tracking techniques. In other embodiments, icon configuration program 124 automatically generates an entirely new icon, on-the-fly, based on the class of user. For example, a user is communicating with an autistic person and types ":)" for an emotion icon. Icon configuration program 124 determines that, for the recipient, an on-the-fly creation of an entirely new icon with clapping hands is warranted because this better displays the emotional intent in a manner the recipient can comprehend.

In some embodiments, icon configuration program 124 uses known icons and converts one icon into several icons or several icons into fewer icons, in order to increase the accuracy and/or efficacy of an emotion expressed, so that the icons are optimized for comprehensibility by various classes of users. In other embodiments, icon configuration program 124 can convert emotion icons to real facial expressions depicted on an image of a human face (e.g., a generic image of a face, or an image of a face known to the parties in the communication). The use of real facial expressions may help some classes of users to better understand certain emotional nuances. Optionally, animation may be used to automatically convey emotions for different classes of users in an improved manner.

In other embodiments, icon configuration program 124 can identify emotions using a voice-detecting machine learning algorithm which extracts emotion content from an audio input (i.e., voice or other sound input), analyzes the audio input, and outputs the closest appropriate emotion icon for the emotion the user wishes to convey. In a similar embodiment, icon configuration program 124 can create a new icon on-the-fly, based on an audio input by the user. For example, a user wishes to respond to a text message, but is not sure which emotion icon best expresses his feelings. The user speaks: "I am angry at John because he is mean to me." Icon configuration program 124 can generate a new icon to appropriately convey the user's emotions to a recipient (e.g., an entirely new icon with certain eye, eyebrow, and mouth characteristics to convey anger). In another example, icon configuration program 124 may be configured to control ten facial parameters, where each facial parameter has ten settings, providing for 10 billion possible different face emotion icons which icon configuration program can generate and output to a user. In this example, the controlled facial features may be: head eccentricity, eye eccentricity, pupil size, eyebrow slant, nose size, mouth shape, eye spacing, eye size, mouth length, and degree of mouth opening. Head eccentricity may, for example, control how elongated the head is in either the horizontal or vertical direction. The mouth, for example, can be constructed using parabolic interpolation routines, and the other features may be derived from circles, lines, and ellipses.

In some embodiments, inserting an icon into a conversation is performed manually by the user, and icon configuration program 124 can suggest an icon(s) for a user when the user is not sure which icons to use. For example, a list of emotion icons may be shown as keys of a virtual keyboard, and icon configuration program 124 may suggest appropriate icons to use by lighting up those icons on the virtual keyboard. In another example, icon configuration program 124 may suggest emotion icons to use based on the type of interaction (e.g., relationship or social interaction) with the recipient (e.g., certain emotion icons are more likely to be used by women than men).

In step 206, icon configuration program 124 removes or embeds additional emotion icons. In this exemplary embodiment, icon configuration program 124 can automatically remove emotion icons from a communication when the emotion icons are determined to be inappropriate, excessive, or unnecessary. For example, a user suffering from obsessive compulsive disorder may perform certain verbal acts or gestures repeatedly, and for no outwardly obvious reason. The use of emotion icons can therefore be excessive. Icon configuration program 124 can detect when emotion icons are unnecessary or excessive and automatically remove the excessive emotion icons from a communication. In some embodiments, icon configuration program 124 detects the real-time emotions of a user and/or recipient, based on the techniques described above, and removes emotion icons deemed excessive, based on the real-time mood of the user or recipient. In other embodiments, a filter on a recipient's device can be used to remove emotion icons, in the case where emotion icons may be deemed inappropriate, upsetting, unwelcome, or disturbing to a user, based on the user's culture, cognitive state, or other reasons.

In another embodiment, icon configuration program 124 can embed suppressed emotion icons in a communication. The suppressed emotion icons are latent in the text of a communication, and may be uncovered by the recipient using a GUI gesture, such as a mouse over, mouse hover, or other GUI gestures known in the art. Suppressed emotion icons can allow a user the opportunity to embed many more emotion icons than is normal, with the understanding that the emotion icons will be suppressed, and the recipient will receive them only as embedded annotation on an otherwise clean text communication. For example, a recipient with autism may use the embedded emotion icons as annotation to help provide emotional context and clarity as to the emotional intent the sender wishes to convey (e.g., an insult sent by a sender in gest may be better understood once a recipient hovers over the text, and reveals an embedded 'smiley' emoticon). In some embodiments, the presence of embedded emotion icons may be suggested by an indicator, such as a subtle difference in the color or font of text, or other means known in the art. Optionally, the indicators can be 'toggled off', and thus not be displayed for a certain piece of text, if desired. Icon configuration program 124 can detect possible confusion about the meaning of a communication for a recipient (e.g., by studying a user's face using a facial recognition system), and automatically reveal the embedded emotion icons to the recipient.

In step 208, icon configuration program 124 receives feedback. Icon configuration program 124 can receive feedback from a user, for example, via a user selection of a GUI associated with a communication (e.g., an e-mail or an instant messaging system). This helps icon configuration program 124 to continue to learn the use patterns of a particular user, in order to become more effective and accurate with each use. For example, if a conversation seems to have gone well and both parties seem to be in agreement, one or more of the parties to the conversation may select a 'satisfied' button.

In some embodiments, a speech output (i.e., written or spoken text) relating to an emotion icon may be enabled on a user's device. For example, some classes of users may be more familiar with word descriptions than facial expressions as depicted with emotion icons, and may more easily understand a verbal interpretation of the emotion of an emotion icon, rather than simply viewing the emotion icon.

Figure 3:
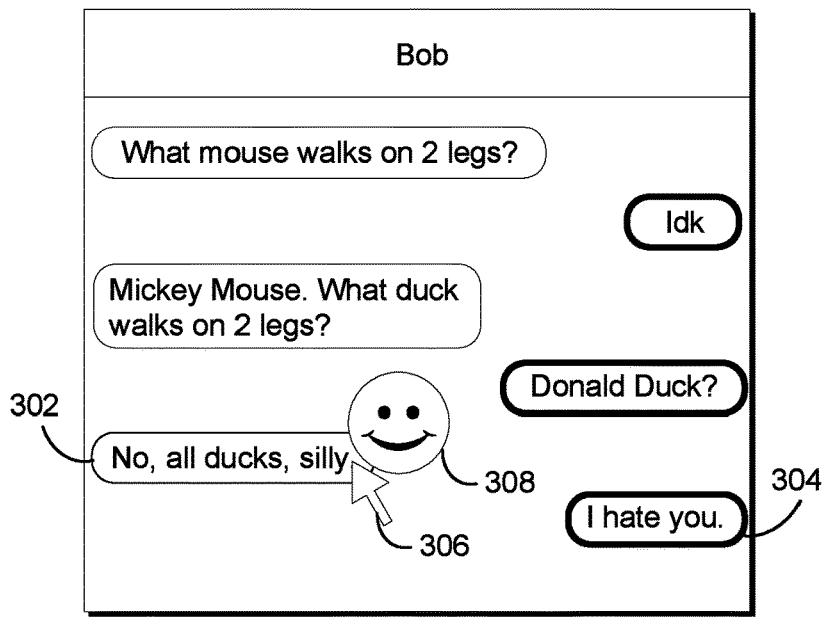
FIG. 3 depicts an example conversation in which embedded icons are used, in accordance with an embodiment of the present invention.

FIG. 3 depicts an example conversation in which embedded icons are used, in accordance with an embodiment of the present invention.

A conversation between two people is depicted, in which the first user makes a statement 302 in gest. The second user, based on their cognitive state, does not comprehend that the first user is joking, and sends statement 304. The second user has the option to hover over statement 302, using mouse icon 306, and reveal emoticon 308 (i.e., a 'smiley' icon) in order to better understand that the first user is making a joke and did not intend to be mean in their communication.

Figure 4:
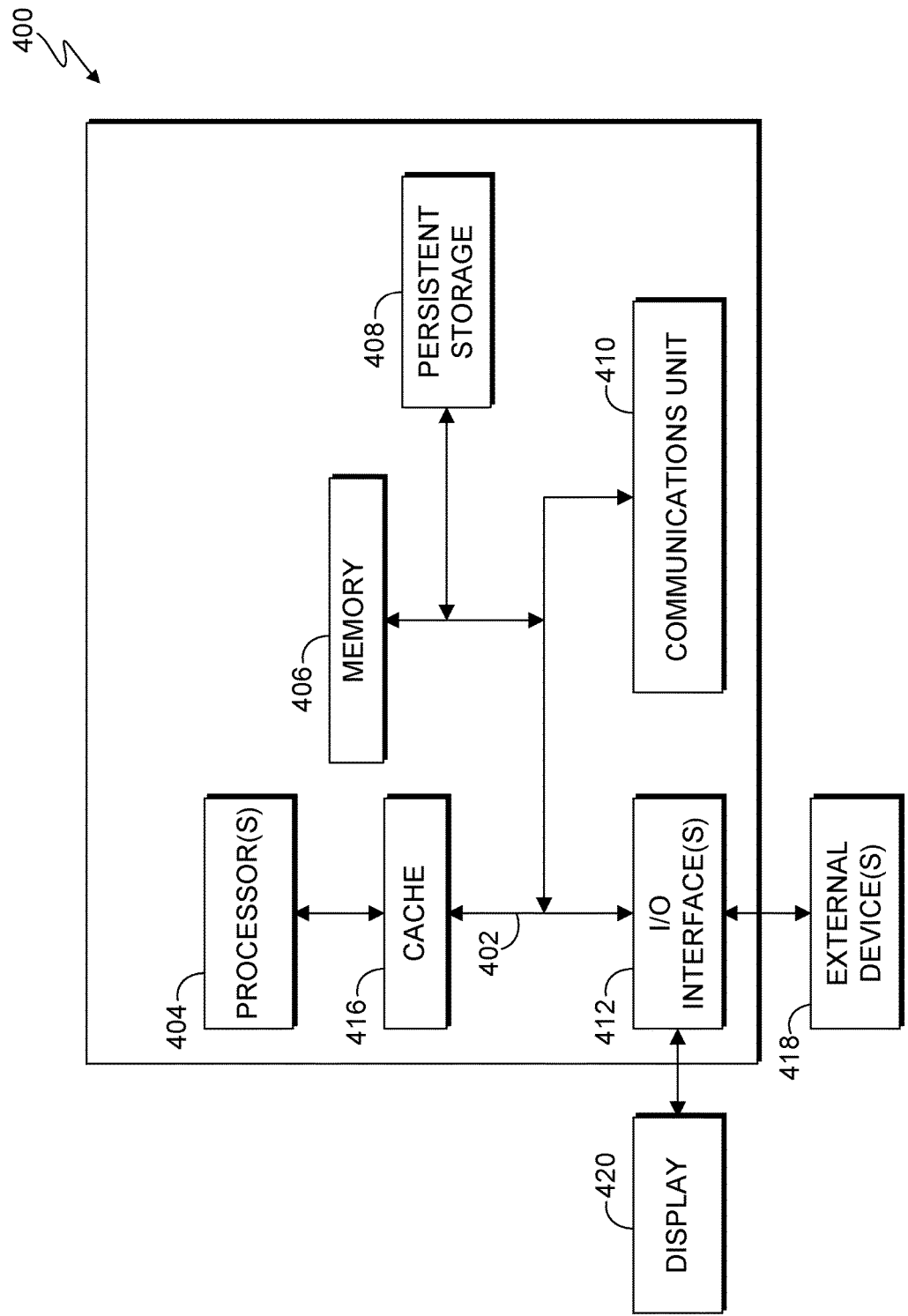
FIG. 4 is a block diagram of internal and external components of the computing devices of FIG. 1, in accordance with an embodiment of the present invention.

FIG. 4 is a block diagram of internal and external components of a computing device 400, which is representative of the computing device of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 412 provides for communications with other computer systems or devices via a network (e.g., network 110). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computing device 400 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computing device 400. For example, I/O interface 414 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
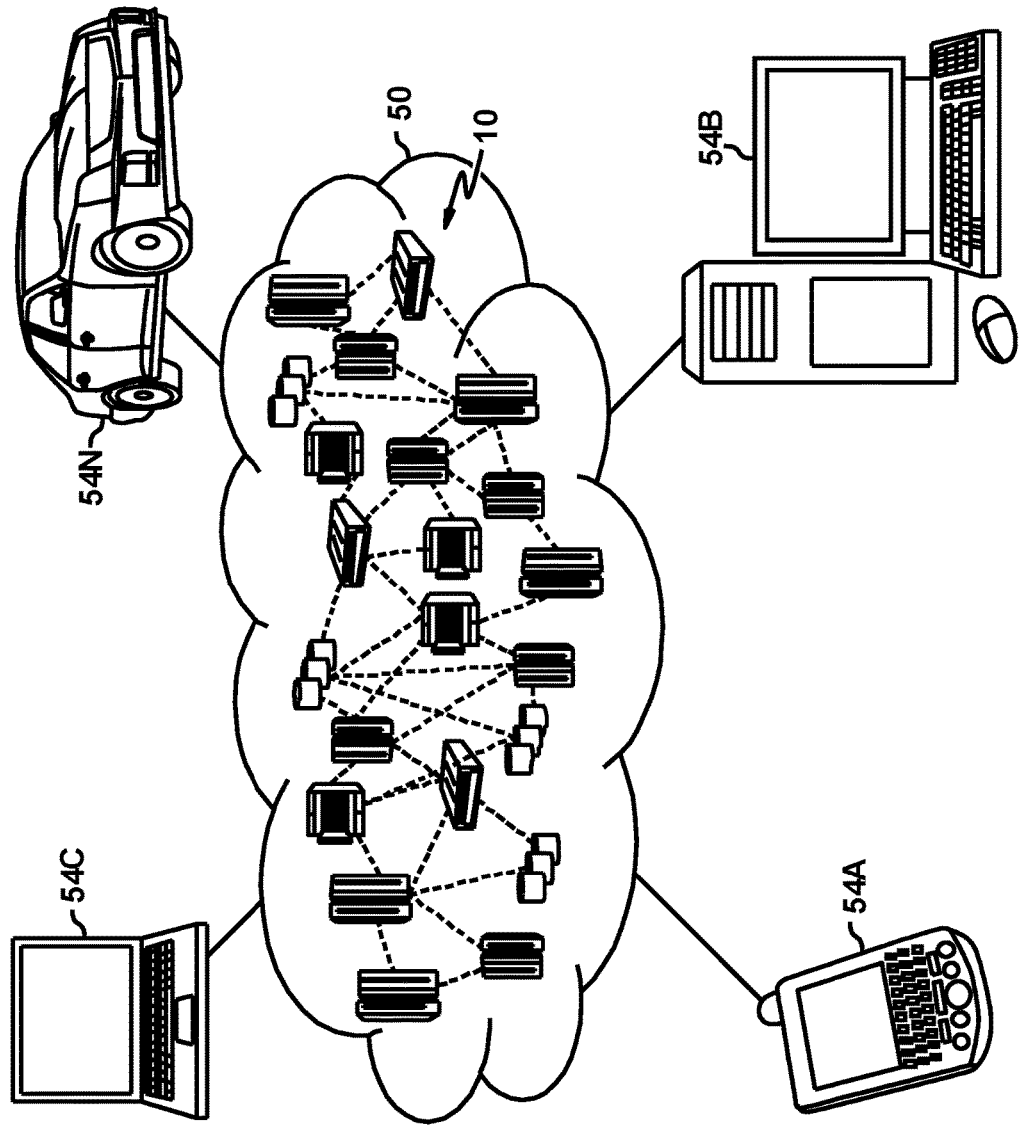
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
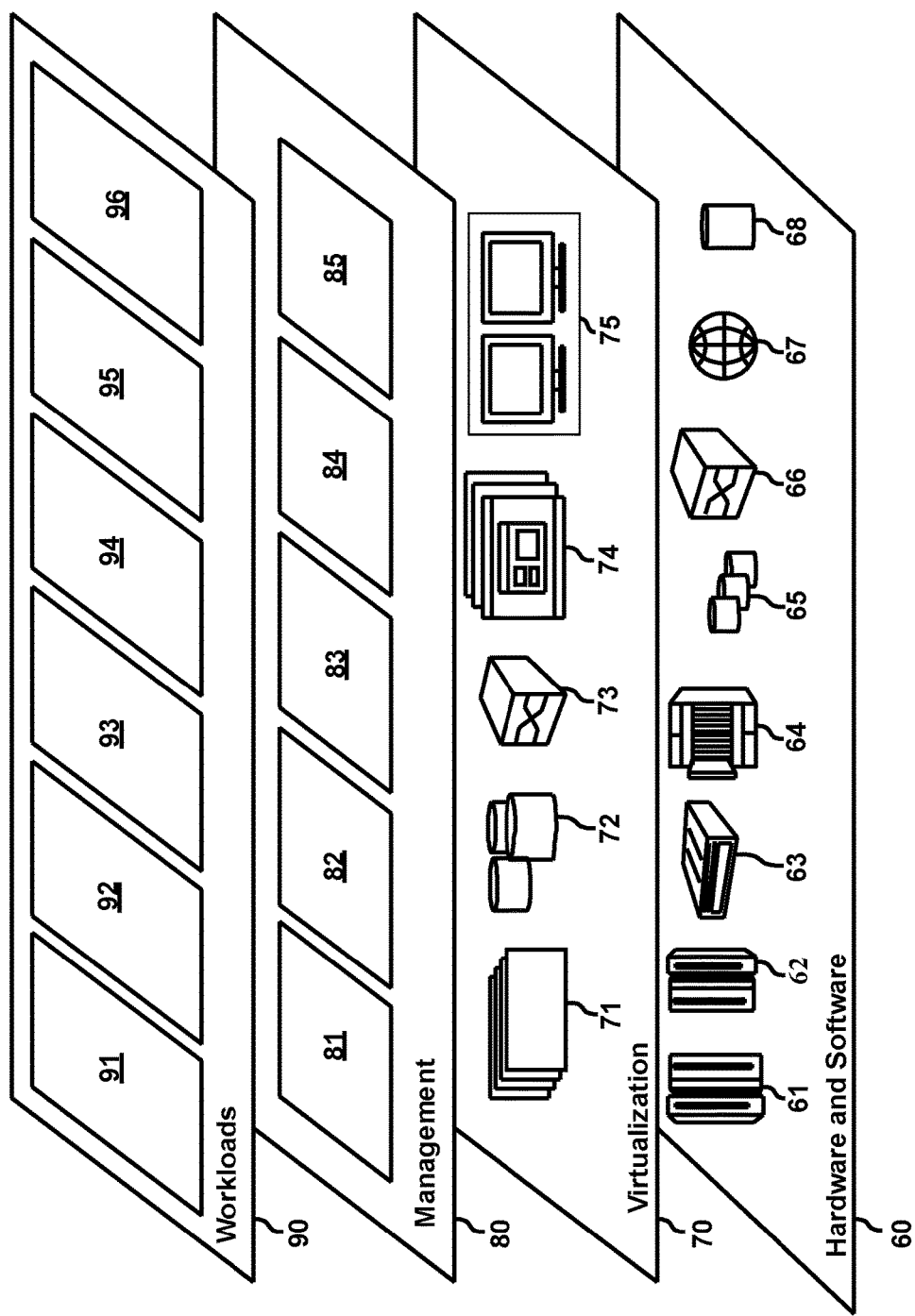
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual icon determination 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   generating, by one or more processors, a plurality of emotion icons, wherein the plurality of emotion icons is based on a class of a user, a class of a recipient, one or more facial parameters of the user, and one or more facial parameters of the recipient, wherein the class of the user is based on a current state of the user and a cognitive style of the user, wherein the class of the recipient is based on a current state of the recipient and a cognitive style of the recipient, wherein a current state of the user includes a current emotional state of the user, and wherein a cognitive style of the user reflects the user's cultural norms, demographic, and mental conditions;

determining, by one or more processors, for a user, at least one emotion icon among the plurality of emotion icons to automatically input into a message based on the class of the user, the class of the recipient and a context of the message;

inserting, by the one or more processors, the determined at least one emotion icon among the generated plurality of emotion icons into the message in response to determining the context of the message; and generating, by the one or more processors, a new emotion icon from the generated plurality of emotion icons based on the one or more facial parameters and the determined context of the message.

2. The method of claim 1, wherein generating the new emotion icon, comprises:
learning, by the one or more processors, communications patterns between the user and the recipient of the message, wherein the learned communication patterns are incorporated into the context by performing analytics.

3. The method of claim 2, wherein the learned communication patterns of the user and the recipient are based, in part, on: text analysis associated with used emotion icons and the class of the user, wherein the text analysis is incorporated into the context of the message by performing analytics.

4. The method of claim 1, wherein determining the at least one emotion icon further comprises:
from a user input, converting the user input to at least one emotion icon that is recognizable to the recipient, based on the class of the recipient.

5. The method of claim 1, wherein determining at least one emotion icon for a user to input into the message further comprises:
generating, by the one or more processors, a list of emotion icons, wherein the list of emotion icons are: (i) selectable by the user, and (ii) incorporated into the plurality of emotion icons, wherein the list of emotion icons are generated based on a type of social interaction between the user and the recipient, and wherein the type of social interaction between the user and the recipient are incorporated into the context of the message by performing analytics.

6. The method of claim 1, further comprising:
based on the class of the user and the recipient, embedding at least one emotion icon into the message, wherein the embedded at least one emotion icon is visible to the recipient responsive to a mouse hover gesture.

7. The method of claim 1, further comprising:
receiving, by the one or more processors, feedback from at least the user or the recipient, based on the determined at least one emotion icon among the plurality of emotion icons inserted into the message, wherein receiving feedback comprises a user selection of a GUI associated with an e-mail or instant messaging system;
determining, by the one or more processors, whether an emotion icon among the plurality of emotions icons is unnecessary in the message based on the determined context performed by analytics; and
in response to determining that the emotion icon among the plurality of emotion icons is unnecessary in the message, removing, by the one or more processors, the emotion icon from the message.

8. The method of claim 1, wherein generating a plurality of emotion icons is further based on audio input comprising one or more sounds different from speech of the user.

9. The method of claim 8, wherein generating a plurality of emotion icons comprises identifying context of a conversation based on the audio input of the user.

10. A computer program product comprising:
a computer readable storage medium and program instructions stored on the computer readable storage medium, the program instructions comprising:
program instructions to generate a plurality of emotion icons, wherein the plurality of emotion icons is based on a class of a user, a class of a recipient, one or more facial parameters of the user, and one or more facial parameters of the recipient, wherein the class of the user is based on a current state of the user and a cognitive style of the user, wherein the class of the recipient is based on a current state of the recipient and a cognitive style of the recipient, wherein a current state of the user includes a current emotional state of the user, and wherein a cognitive style of the user reflects the user's cultural norms, demographic, and mental conditions;
program instructions to determine, for a user, at least one emotion icon among the plurality of emotion icons to automatically input into a message based on the class of the user, the class of the recipient and a context of the message;
program instructions to insert the determined at least one emotion icon among the generated plurality of emotion icons into the message in response to determining the context of the message; and
program instructions to generate a new emotion icon from the generated plurality of emotion icons based on the one or more facial parameters and the determined context of the message.

11. The computer program product of claim 10, wherein the program instructions to generate the new emotion icon, comprise:
program instructions to learn communications patterns between the user and the recipient of the message, wherein the learned communication patterns are incorporated into the context of the message by performing analytics.

12. The computer program product of claim 11, wherein the learned communication patterns of the user and the recipient are based, in part, on: text analysis associated with used emotion icons and the class of the user, wherein the text analysis is incorporated into the context of the message by performing analytics.

13. The computer program product of claim 10, wherein the program instructions to determine the at least one emotion icon further comprise:
program instructions to convert a user input to at least one emotion icon that is recognizable to the recipient, based on the class of the recipient.

14. The computer program product of claim 10, wherein the program instructions to determine at least one emotion icon for a user to input into the message further comprise:
program instructions to generate a list of emotion icons, wherein the list of emotion icons are: (i) selectable by the user and (ii) incorporated into the plurality of emotion icons, wherein the list of emotion icons are generated based on a type of social interaction between the user and the recipient, and wherein the type of social interaction between the user and the recipient are incorporated into the context of the message by performing analytics.

15. The computer program product of claim 10, further comprising:
program instructions to receive feedback from at least the user or the recipient, based on the determined at least one emotion icon among the plurality of emotion icons inserted into the message, wherein the program instructions to receive feedback comprise a user selection of a GUI associated with an e-mail or instant messaging system;
program instructions to determine whether an emotion icon among the plurality of emotion icons is unnecessary in the message based on the determined context performed by analytics; and
program instructions to, in response to determining that the emotion icon among the plurality of emotion icons is unnecessary in the message, remove the emotion icon from the message.

16. The computer program product of claim 10, wherein the program instructions to generate a plurality of emotion icons is further based on audio input comprising one or more sounds different from speech of the user.

17. A computer system comprising:
one or more computer processors;
one or more computer readable storage media;
program instructions stored on the one or more computer readable storage media for execution by at least one of the one or more processors, the program instructions comprising:
program instructions to generate a plurality of emotion icons, wherein the plurality of emotion icons is based on a class of a user, a class of a recipient, one or more facial parameters of the user, and one or more facial parameters of the recipient, wherein the class of the user is based on a current state of the user and a cognitive style of the user, wherein the class of the recipient is based on a current state of the recipient and a cognitive style of the recipient, wherein a current state of the user includes a current emotional state of the user, and wherein a cognitive style of the user reflects the user's cultural norms, demographic, and mental conditions;
program instructions to determine, for a user, at least one emotion icon among the plurality of emotion icons to automatically input into a message based on the class of the user, the class of the recipient and a context of the message;
program instructions to insert the determined at least one emotion icon among the generated plurality of emotion icons into the message in response to determining the context of the message; and
program instructions to generate a new emotion icon from the generated plurality of emotion icons based on the one or more facial parameters and the determined context of the message.

18. The computer system of claim 17, wherein the program instructions to generate the new emotion icon, comprise:
program instructions to learn communications patterns between the user and the recipient of the message, wherein the learned communication patterns are incorporated into the context of the message by performing analytics.

19. The computer system of claim 18, wherein the learned communication patterns of the user and the recipient are based, in part, on: text analysis associated with used emotion icons and the class of the user, wherein the text analysis is incorporated into the context of the message by performing analytics.

20. The computer system of claim 17, wherein the program instructions to determine the at least one emotion icon further comprise:
program instructions to convert a user input to at least one emotion icon that is recognizable to the recipient, based on the class of the recipient.

* * * * *